June 19, 1923.

E. M. ORSTAD

HORSE PROTECTOR

Filed April 14, 1922

E. M. Orstad
INVENTOR

BY Victor J. Evans
ATTORNEY

WITNESS:

Patented June 19, 1923.

1,459,601

UNITED STATES PATENT OFFICE.

ELMER M. ORSTAD, OF PARK RIVER, NORTH DAKOTA.

HORSE PROTECTOR.

Application filed April 14, 1922. Serial No. 552,737.

*To all whom it may concern:*

Be it known that I, ELMER M. ORSTAD, a citizen of the United States, residing at Park River, in the county of Walsh and State of North Dakota, have invented new and useful Improvements in Horse Protectors, of which the following is a specification.

This invention relates to protective devices for horses and has for its object the provision of a novel device of screen like formation designed to be supported upon the head of a horse and which is secured to the bridle and throat latch for the purpose of covering the nose and the throat to protect the animal against bot flies, it being well known that these insects frequently gather on the throat and the nose of the horse and cause extreme discomfort.

An important object is the provision of a device of this character which is constructed as a frame padded to prevent chafing and covered with wire screen the entire structure being a complete and separate entity which may be quickly and easily placed in position without requiring any adjustment.

An additional object is the provision of a device of this character which will be simple and inexpensive in construction, easy to apply, efficient and durable in service and a general improvement in the art.

With the above and other objects and advantages in view, the invention consists in the details of construction to be hereinafter more fully described and claimed, and illustrated in the accompanying drawings, in which:

Figure 1:
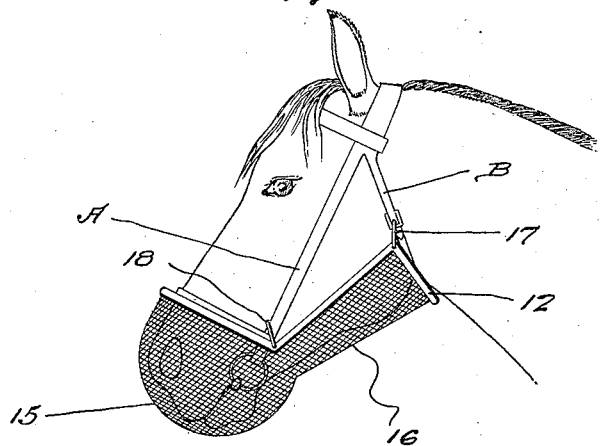
Figure 1 is a side elevation of the device in applied position.
Figure 2:
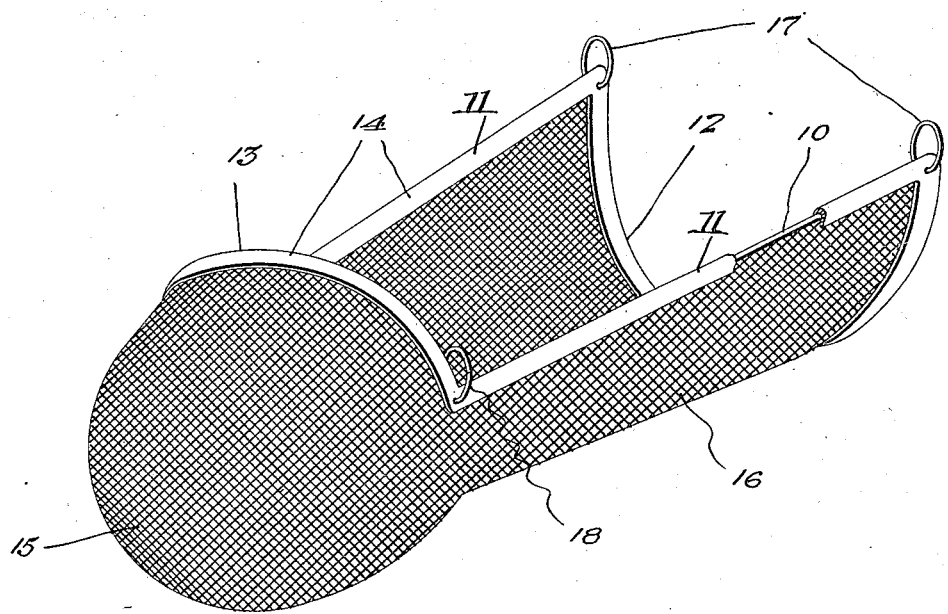
Figure 2 is a detail perspective view thereof detached, a portion of the padding being broken away to disclose the structure.

Referring more particularly to the drawings I have shown my device as comprising a wire frame 10 which includes sides 11 connected at one end by a semi-circular cross member 12 and connected at the other end by a semi-circular cross member 13 which extends in the opposite direction to the member 12. This frame is preferably covered with padding indicated at 14 so as not to chafe the animal when in position. The frame is covered with wire screen so arranged as to form a substantially semi-spherical portion 15 which encircles the animal's nose and an elongated portion 16 which covers the throat as clearly shown in Figure 1.

It is of course conceivable that any one of a wide variety of means might be employed for holding the device in position, though in actual practice I provide rings 17 which are located at the rear corners, that is at the junctures of the side members 11 with the cross member 12, and other rings 18 which are located at the junctures of the side members with the front cross member 13. The rings 18 are connected with the bridle A in an obvious manner while the rings 17 are connected with the throat latch B in a similar manner.

Assuming that the device has been constructed and placed in position as above described, it will be apparent that the animal's nostrils and nose and also the throat will be protected against the ravages of bot flies so that the animals will be far more comfortable and will consequently remain in better spirits and health.

From the foregoing description and a study of the drawings it will be apparent that I have thus provided a very simply constructed and consequently inexpensive protector for the purpose specified which will efficiently perform all the functions for which it is intended and which will be of manifest advantage to owners and drivers of horses. Owing to the fact that there are no moving parts it is apparent that there is nothing to get out of order and that the device should have a long life.

While I have shown and described the preferred embodiment of the invention, it is of course to be understood that I reserve the right to make such changes in the form, construction and arrangement of parts as will not depart from the spirit of the invention or the scope of the subjoined claim.

Having thus described my invention I claim:

A protector of the character described comprising a frame including spaced side members connected at one end by a substantially semi-circular downwardly extending cross member and connected at their outer ends by a substantially semi-circular upwardly extending cross member, a screen including a partially spherical portion secured to said last named cross member for encircling the nose and mouth of a horse, said screen further including a trough like portion formed as a continuation of one side of the partially spherical portion and secured to the side members and first named cross member of the frame, and attaching rings located at the junctures of the side members with both of said cross members and adapted for connection with the bridle.

In testimony whereof I affix my signature.

ELMER M. ORSTAD.